United States Patent [19]
Flohr

[11] 3,950,022
[45] Apr. 13, 1976

[54] POWER HAY FORK

[76] Inventor: Henry Flohr, P.O. Box 647, Saratoga, Wyo. 82331

[22] Filed: Dec. 16, 1974

[21] Appl. No.: 532,943

[52] U.S. Cl. ................................. 294/88; 294/107
[51] Int. Cl.² .......................................... B66C 3/04
[58] Field of Search ............. 294/88, 105, 106, 107, 294/108, 109, 110 R, 115, 120; 37/182; 214/147 R, 147 G

[56] References Cited
UNITED STATES PATENTS

| | | | |
|---|---|---|---|
| 271,538 | 1/1883 | Stone | 37/182 X |
| 2,435,119 | 1/1948 | Baker | 294/109 X |
| 2,474,374 | 6/1949 | Shattuck | 214/147 G |
| 2,696,926 | 12/1954 | Squires et al. | 294/88 X |
| 3,039,812 | 6/1962 | Nimeskern | 294/88 |
| 3,055,521 | 9/1962 | Crampton | 214/147 G |

Primary Examiner—John J. Love
Assistant Examiner—Johnny D. Cherry

[57] ABSTRACT

A hydraulic hay fork for grappling hay comprising an hydraulic cylinder with a vertically moving depending shaft to which radially extending clawlike teeth are pivotally attached, and holding assemblies pivotally attached about midway along each tooth, means attaching the holding assemblies to the cylinder housing so that upward movement of the cylinder shaft will cause the teeth to grip, and an anti-bending telescoping assembly disposed alongside the cylinder and shaft and attached in a manner preventing rotation of shaft and teeth.

The hay fork described in which the holding assemblies comprise a pair of relief rod assemblies for each tooth providing a yielding connection and a strengthening rigidity to each tooth.

6 Claims, 5 Drawing Figures

POWER HAY FORK

FIELD OF THE INVENTION

This invention is in the field of hay-grappling forks which can be mounted on the boom of a boom-hoisting vehicle so as to facilitate the scattering of hay evenly for the feeding of animals so that each animal will get its share of feed.

DESCRIPTION OF THE PRIOR ART

In the prior art, the most similar of the hay forks to the hay fork of this invention is one which had been invented by myself and which I had manufactured and sold for many years.

However, my former hay fork had the disadvantage that it was weak and became bent out of shape when my old fork was closed on solid hay because it would try to compress the springs of the relief rods, but as there was no stable means of preventing the tooth hub or spider from rotating out of place to a point of least resistance, much bending would occur.

Even though the bending had a disadvantage, my old hay fork had much merit because as the fork is closed it changes the angle of each tooth to a "fishhook" or "eagle claw" angle so it will hold the hay in its grip, even though the teeth are not pulled in to the center of the fork. This makes the fork good for scattering hay to livestock on the ground, since the fork can be opened a little at a time and the hay can be scattered out in small bunches. For this reason, the fork can be used to transfer hay directly from stack to livestock, to a hayrack, to feed bunks, or to feed hay into a chopper.

However, the bending and twisting is a major problem because it is rather frequently that the fork becomes closed on solid hay and the hyraulic cylinder shaft rotates out of place causing bending of parts that are costly to straighten out or replace.

This bending or distortion of the hay fork was because of the inherently weak structure with far-extended teeth like the legs of a "grand-daddy long-legs spider", so stretched out that the strength of compactness was completely absent.

The hydraulic cylinder shaft is highly polished and rotates freely and cannot be prevented from rotation by a spline because the spline would prevent hydraulic sealing at the cylinder assembly housing.

The bending and distortion would tend to bend the strap irons forming the inner ends of the teeth, would bend the flanges of the teeth-holding hub or spider, and particularly, would bend the relief rods with their inherent weakness because of their great length giving a leverage effect, causing their frequent bending.

Another problem was that the shaft of the hydraulic cylinder has only a small portion left within the cylinder housing or body so that when the teeth hook into a solid object, the shaft is often bent.

It is an object of this invention to provide an anti-bending assembly disposed alongside of the hydraulic cylinder and preventing a twisting or rotation of the cylinder shaft, and in addition, supporting the shaft because the telescoping part of the telescoping anti-bending assembly has a substantial portion disposed in its tubular section at all times.

Another object is to provide a special way of strengthening the relief rods by providing tandem relief rods disposed alongside each other for giving a maximum of resistance to bending proportional to the amount of costly steel because of the importance of low-cost in the product; the tandem relief rods being disposed, specifically, placed apart laterally of the weak, elongated teeth to give a maximum resistance to bending proportional to the weight and expense of the steel.

SUMMARY OF THE INVENTION

An anti-bending hay fork for grappling hay comprising a fluid means pressure housing such as the housing of a hydraulic or pneumatic cylinder, piston means slidable in the housing and extending downwardly therefrom, radially extending clawlike teeth pivotally attached to the lower end of the shaft by means of a hub, holding assemblies pivotally attached about midway along each tooth and attached to the cylinder housing in a manner so that the upward movement of the cylinder shaft will cause the teeth to grip, and an anti-bending telescoping assembly disposed alongside the cylinder and shaft and attached to the fork in a manner preventing rotation of the shaft and of the teeth about the axis of the shaft so as to prevent distortion of parts when the teeth are gripping an excessively solid load, is a feature which is a main objective of this invention to provide.

A further object of this invention is to provide the hay fork described in which the holding assemblies each comprise a pair of relief rod assemblies whereby there are two relief rod assemblies for each tooth, the relief rod assemblies being spaced apart in a direction at a right angle to the tooth as seen in top plan view so as to provide a maximum of resistance to bending distortion of the relief rods proportional to the cost of the material of which the relief rods are composed.

Still another object is to provide a way of attaching each relief rod assembly to a special plate, the plates being disposed one on each side of the tooth to which they are pivotally attached so as to provide further resistance to bending.

DESCRIPTION OF THE PREFERRED EMBODIMENT

Figure 1:
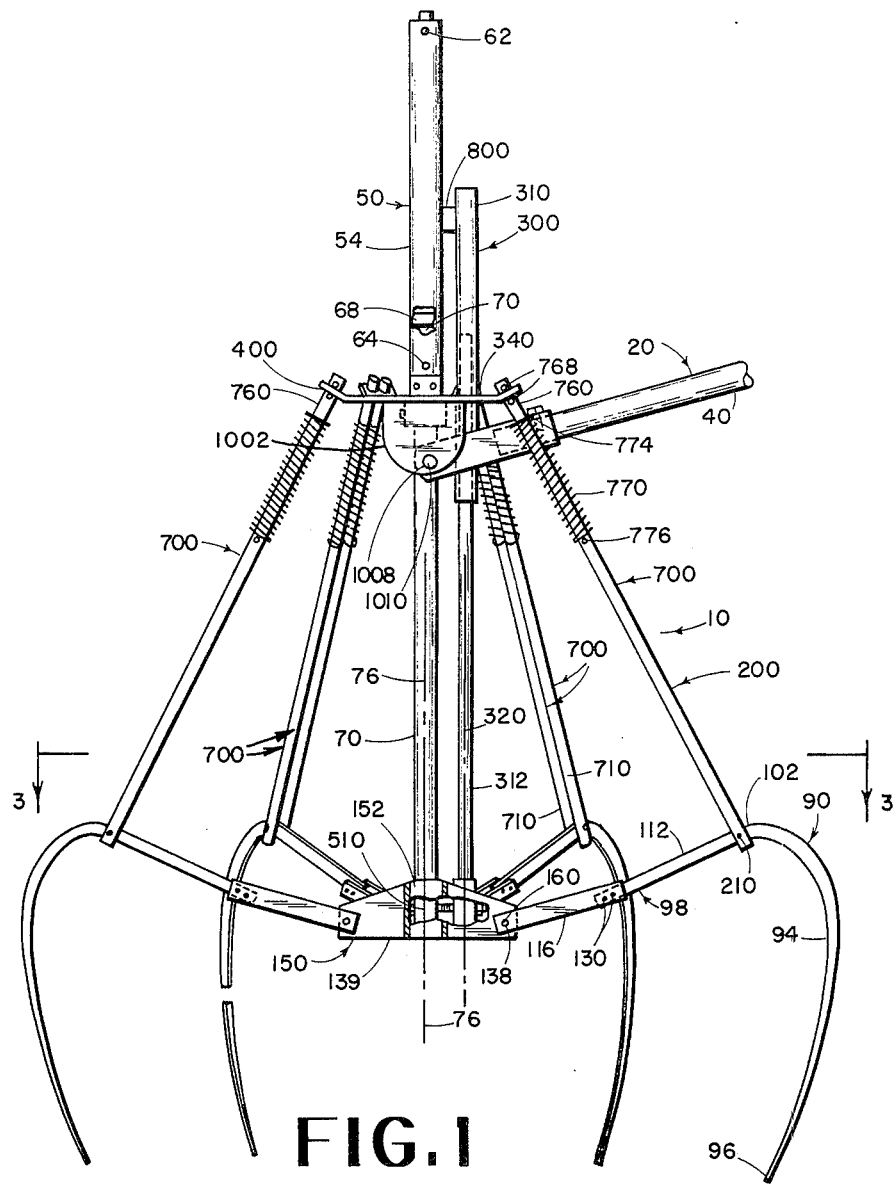
FIG. 1 is a side elevation of the anti-bending hay grappling fork shown as it would be seen at an angle with respect to a tooth-control shaft or hydraulic cylinder shaft axis substantially as indicated along the line 1—1 of FIG. 2, but not showing the two teeth closest to the viewer, and not showing the spider flanges or tooth-hub flanges which are closest to the viewer, except for small portions of the latter which are shown in section, for better illustration and understanding, and a portion of the tooth-hub being broken away for showing the interior.
Figure 2:
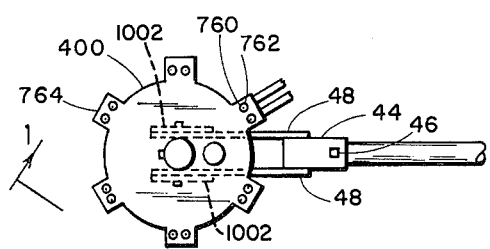
FIG. 2 is a top plan view of the hay fork shown in FIG. 1, but with all parts below an upper relief rod carrying plate being removed, except for clevis plates of a boom assembly, and parts of the boom assembly itself showing in dotted lines and a portion of the boom assembly being shown in full lines, and further except that the view does not show the relief rods except for one pair, all but small portions of the tops of the latter being broken away.

The anti-bending hay fork of this invention is generally indicated at 10 in FIG. 1 and is adapted to be carried on an elevating boom and vehicle assembly generally indicated at 20, although the only part of it shown is the forward end of a boom 40 thereof which is received in a sleeve 44 to which it is fixed by a screw 46, the sleeve 44 being disposed between and attached to two plates 48, which latter will be later described.

The hay fork 10 comprises a hydraulic cylinder assembly generally indicated at 50 and having a fluid means pressure housing 54 provided with an upper hydraulic fluid port 62 and a lower hydraulic fluid port 64 for receiving hydraulic fluid or other fluid means, such as compressed air, if desired, although hydraulic power is much more available in areas where hay forks are used.

In the pressure housing 54 is a piston 68 to the lower end of which a tooth-control shaft 70 is attached, whereby the shaft 70 slidably extends through the lower end of the housing 54 for upward and downward movements with respect thereto.

The upward and downward movements are controlled by selective introduction and removal of fluid means at the ports 62 and 64 in usual manners for causing the piston 68 to reciprocate along the housing 54 in a direction in alignment with an axis 76 of the shaft 70.

A plurality of hay-gripping teeth 90 each having a downwardly depending outer tooth section 94 spaced from the tooth-control shaft axis 76 are seen in top plan view in FIG. 1 to be substantially radially disposed about the axis 76 and also to lie generally on a circular configuration as regards the lower tip ends 96 of the teeth 90.

Each tooth 90 further has an inner tooth section generally indicated at 98 attached to the upper end 102 of the downwardly depending outer tooth section 94. The inner tooth sections 98 extend toward the axis 76.

The inner tooth sections 98 are formed of a downwardly and inwardly extending first tooth section 112 for each tooth, which latter is attached to the inner end 102 of the downwardly depending section 94 by being of one piece therewith in manufacture.

Figure 3:
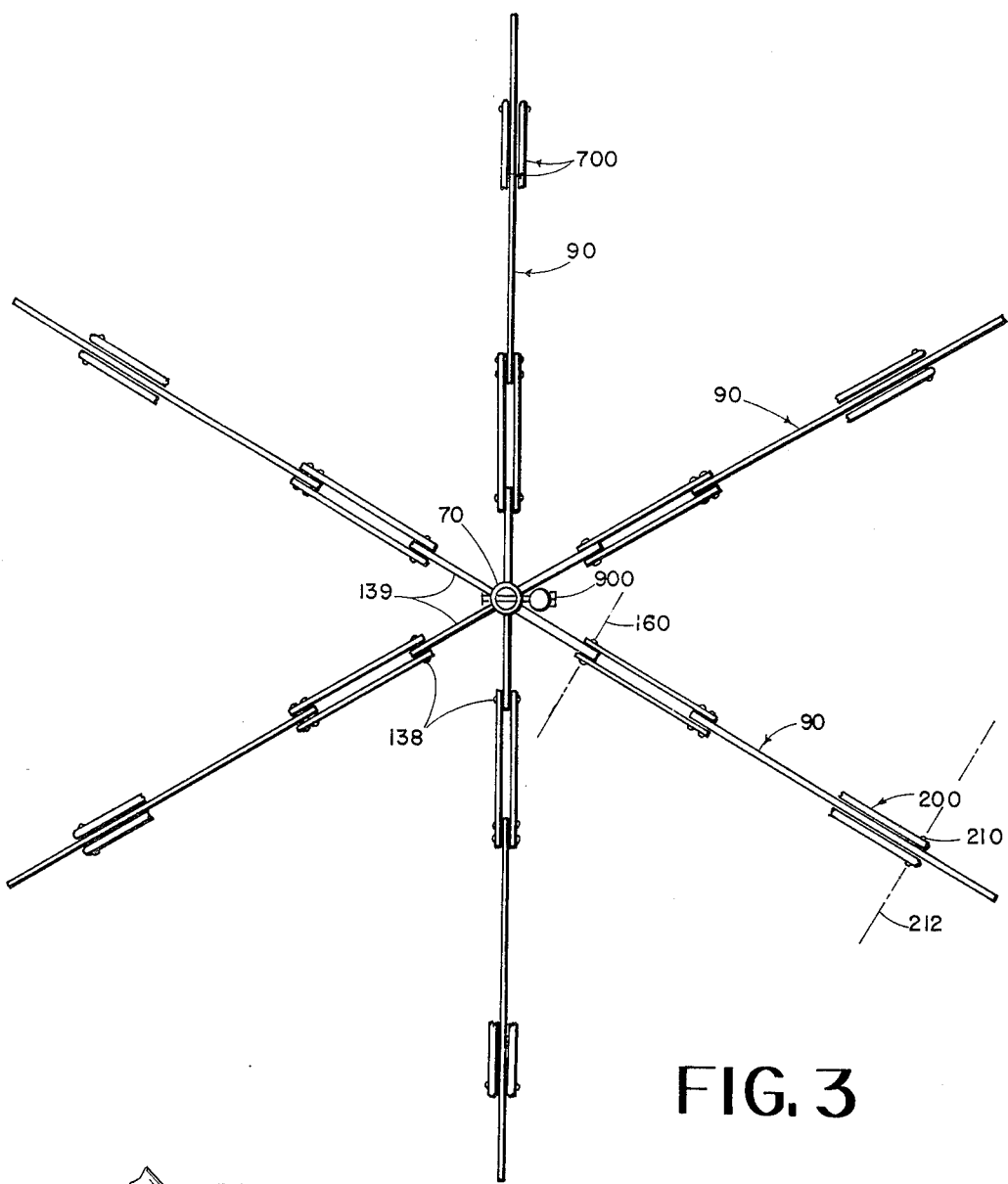
FIG. 3 is a sectional view taken along the line 3—3 of FIG. 1, but with all six of the teeth and portions of all relief rods showing.

The inner tooth section 98 of each tooth is further composed of two strap irons or straps 116, which latter can be seen in FIG. 3 to be attached at their outer ends to the first inner tooth portion 112 by means of two rivets 130 for providing a rigid connection, but one which is removable if need be.

The inner end of each of the straps 116 is connected by a bolt 138 to one of the radially extending legs 139 of a tooth attachment hub or spider 150, which latter has a sleeve portion 152 rigidly attached to and receiving the lower end of the shaft 70.

The legs 139 each have two sides which are disposed in vertical planes and in parallelism whereby the bolts 138 attaching each pair of straps to each of the legs 139 are disposed on tooth pivot axes 160.

The teeth 90 are spaced with respect to each other around the axis 76 in a cooperative relationship for gripping hay. The exact number of teeth is not critical, although it is desirable that there be at least three and, preferably, there are at least six, as shown in FIG. 3. Each tooth pivot axis 160 is disposed substantially at a right angle to the tooth-control shaft axis 76, as seen in top plan view.

Elongated holding assemblies generally indicated at 200 are disposed one at each tooth 90 and reach extend upwardly from a place adjacent approximately a midpoint along a respective tooth 90 at which a bolt 210 is disposed pivotally attaching the lower end of the respective holding assembly 200 to a respective tooth 90 in a manner for rotation about a holding assembly lower pivot axis 212 disposed substantially horizontally and at a right angle to a radius of the tooth-control shaft axis 76.

The upper end of each holding assembly 200 is pivotally attached to the housing 54 in a manner later described for permitting the respective lower end of each housing assembly 200 to move in a manner permitting the respective tooth 90 to move at its lower end from an outer retracted position to an inner hay-gripping position.

The holding assemblies 200 are each sufficiently stiff that as the tooth-control shaft moves from a lower position, as shown in FIG. 1, to an upper position, each respective tooth 90 will be forced to move from the retracted position shown in FIG. 1 to an inner hay-gripping position.

An anti-bending assembly generally indicated at 300 is provided comprising an anti-bending tube 310 having an anti-bending shaft 312 therein and telescoping with respect thereto about an axis of sliding 320 parallel to the tooth-control shaft axis 76.

The tube 310 is suitably attached to the housing 54 such as by being welded at 340 to a relief rod carrying plate 400 which will be later described.

The hay fork 10 can be said to have two anchor parts, one of which is identified at 510 and is a part of the control shaft 70 which is disposed below the housing 54 and, preferably, adjacent the lowermost end thereof. The other of the anchor parts can be considered to be the housing 54 itself.

The fork is provided with means attaching the anti-bending tube 310 and the anti-bending shaft 312 each to a different one of the two anchor parts 50 or 510 described whereby the anti-bending assembly 300 resists rotation of the shaft 70 and resists bending-distortion of parts of the hay fork as the teeth engage excessively dense hay portions or other solid objects, as later described.

Each of the holding assemblies 200, or at least one of them, as a sample, can be considered to comprise two elongated relief rod assemblies 700, which latter are elongated and extend upwardly alongside each other.

Each of the relief rod assemblies 700 comprises an elongated pressing member 710 at its lower end.

Figure 4:
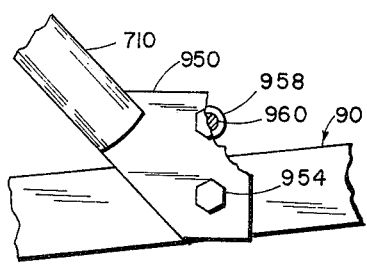
FIG. 4 is an enlarged detail showing a portion of a tooth and the method of attaching a relief rod to it by means of a plate, a portion of the plate being broken away to show a spacer therebehind, and a portion of a plate on the other side of the tooth being shown in full lines, a bolt through the spacer being shown in cross-section, the view being taken at a right angle to a tooth and showing a modification of the way of attaching a relief rod illustrated in FIG. 1, the way of FIG. 4 being stronger and preferred.
Figure 5:
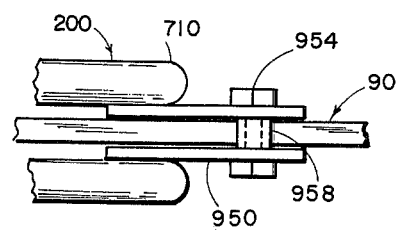
FIG. 5 is a top plan view of the parts shown in FIG. 4, thereby showing a modification of the attachment of two relief rods to a tooth.

In the modification of FIG. 1, the lower ends of each pressing member 710 are disposed one on each side of a respective tooth 90 and are secured thereto by a bolt 210, earlier described, although another form of attachment is shown in FIGS. 4 and 5.

However, referring to FIG. 1, it will be seen that the pivotal attachment accomplished by the bolt 210 of each pressing member 710 to one of the teeth 90 is in a manner for rotation about a holding assembly lower pivot axis 212 of FIG. 3 disposed substantially horizontally and at a right angle to a radius of the tooth-control shaft axis 76.

The upper ends of each of the two pressing members 710 are each received in a sleeve 760, which latter slidably receives the pressing members 710 respectively, each sleeve 760 being disposed through an opening 762 in a holding assembly or relief rod assembly anchor plate 400, earlier described, which latter is rigidly fixed in any suitable manner to the housing 54 and generally extends horizontally outwardly therefrom but with tip end portions 764 which incline upwardly and outwardly, and it is in the latter which the holes 762 are disposed which freely and loosely receive the tubes 760.

The tubes 760 are retained in the plate 400 so that they cannot move upwardly or downwardly with respect thereto by nibs 768 disposed above and below the plate 400 and fixed to the respective tube 760.

Each tube 760 is surrounded by a compression spring 770, which latter engages at its upper end a flange 774 and engages at its lower end a pin 776, which latter is fixed to the respective sliding pressing member 710, whereby the effect of the springs 770 are to hold the pressing members 710 downwardly at all times, but to allow them to contract by compression of the springs 770 so as to yield when an uneven load is disposed between the lower ends of the teeth.

The tube 310 can be attached to the housing 54 and another place, also, if desired, such as by means of a web 800 seen in FIG. 1.

The shaft 312 is attached to the lower end of the tooth-control shaft 70 by means indicated at 900 for rigid attachment so that they stay connected.

Referring now to FIG. 4, it will be seen that the lower end of each of the pressing members 710 is attached on its tooth side to a plate 950, which latter is vertically disposed and engages the adjacent side of a tooth 90 to which it is connected by a bolt 954, which latter is the equivalent of the bolt 210, earlier described.

Since there are two of the plates 950, they can, if desired, be held apart by a spacer 958 disposed around a bolt 960, which latter extends through the plates 950 and holds them toward each other while the spacer 958 holds them apart for giving them a desirable spacing for a snug but good slidable fit with respect to the sides of the tooth 90.

The plates 48 for attachment to the boom are disposed in vertical planes, one on the inner side of each of two clevis plates 1002 which are respectively disposed spaced apart on each side of the underside of the housing 50 and on each side of the shaft 70 and are connected at their upper ends to the plate 400.

The members 48 are attached to the clevis plates 1002 at suitable rotation points provided by rivets 1008 disposed on opposite sides of the axis 76 and providing a pivotal connection about a horizontal axis 1010.

It will be seen that the holding assemblies are each sufficiently stiff that as the control-shaft 70 moves from a lower position to an upper position, the respective tooth will be forced to move from the retracted position with the lower ends of its teeth outward to the hay-gripping position with the lower ends of its teeth inward. Selective positioning, or in other words, selective closing can be done to whatever extent is desired.

I claim:

1. An anti-bending hay fork for grappling hay comprising: a fluid means pressure housing, piston means slidable in said housing, a tooth-control shaft slidably extending through the lower end of said housing for upward and downward movements with respect thereto and connected to the lower end of said piston means, said housing having upper and lower ports at opposite ends of said piston whereby selective introduction and removal of a fluid means at said ports will cause said piston and tooth-control shaft to move downwardly and upwardly respectively along a straight shaft-axis, a plurality of hay-gripping teeth each having a downwardly depending outer tooth section spaced from said tooth-control shaft as seen in top plan view and an inner tooth section attached to the upper end of said downwardly depending tooth section and inwardly extending therefrom toward said tooth-control shaft, a tooth-carrying hub attached to the lower end of said tooth-control shaft, said teeth being spaced with respect to each other around said tooth-control shaft in a cooperative relationship for gripping hay, means pivotally attaching to said hub those ends of each of said inner tooth sections which are closest to said hub in a manner for swinging of said inner tooth sections upwardly and downwardly at their outer ends each about a respective substantially horizontal tooth pivot axis through the respective inner tooth portion, said tooth pivot axes being disposed substantially at a right angle to said tooth-control shaft, elongated holding assemblies disposed one at each tooth and each extending upwardly from a place adjacent a respective tooth, means pivotally attaching the lower end of each said holding assembly to a respective tooth in a manner for rotation about a holding assembly lower pivot axis disposed substantially horizontally and at a right angle to a radius of said tooth-control shaft axis, means pivotally attaching the upper end of each holding assembly to said housing in a manner permitting the respective lower end of each holding assembly to move in a manner permitting the respective tooth to move at its lower end from an outer retracted position to an inner hay-gripping position, said holding assemblies each being sufficiently stiff that as said tooth-control shaft moves from a lower position toward an upper position the respective tooth will be forced to move from said retracted position to said hay-gripping position, an anti-bending assembly comprising an anti-bending tube having an anti-bending shaft therein and telescoping with respect thereto about an axis of sliding parallel to said tooth-control shaft axis, said hay fork having two anchor parts, one of said anchor parts being a part of said control shaft disposed below said housing, the other of said anchor parts being said housing itself, means attaching said anti-bending tube and said anti-bending shaft each to a different one of said two anchor parts whereby said anti-bending assembly resists rotation of said shaft and bending-distortion of parts of said hay fork as said teeth engage unevenly dense hay portions.

2. An anti-bending hay fork for grappling hay comprising: a fluid means pressure housing, piston means slidable in said housing, a tooth-control shaft slidably extending through the lower end of said housing for upward and downward movements with respect thereto and connected to the lower end of said piston means, said housing having upper and lower ports at opposite ends of said piston whereby selective introduction and removal of a fluid means at said ports will cause said piston and tooth-control shaft to move downwardly and upwardly respectively along a straight shaft-axis, a plurality of hay-gripping teeth each having a downwardly depending outer tooth section spaced from said tooth-control shaft as seen in top plan view and an inner tooth section attached to the upper end of said downwardly depending tooth section and inwardly extending therefrom toward said tooth-control shaft axis, a tooth-carrying hub attached to the lower end of said tooth-control shaft, said teeth being spaced with respect to each other around said tooth-control shaft in a cooperative relationship for gripping hay, means pivotally attaching to said hub those ends of each of said inner tooth sections which are closest to said hub in a manner for swinging of said inner tooth sections upwardly and downwardly at their outer ends each about a respective substantially horizontal tooth pivot axis through the respective inner tooth portion, said tooth pivot axes being disposed substantially at a right angle to said tooth-control shaft, elongated holding assemblies disposed one at each tooth and each extending upwardly from a place adjacent a respective tooth, at least one of said holding assemblies comprising two elongated relief rod assemblies upwardly extending alongside each other, each of said relief rod assemblies comprising an elongated pressing member, means pivotally attaching the lower ends of said two pressing members to one of said teeth in a manner for rotation about a holding assembly lower pivot axis disposed substantially horizontally and at a right angle to a radius of said tooth-control shaft axis, means pivotally attaching the upper ends of each of said two pressing members independently to said housing in a manner permitting the lower ends of said two pressing members to permit the respective tooth to move at its lower end from an outer retracted position to an inner hay-gripping position, said holding assemblies each being sufficiently stiff that as said tooth-control shaft moves from a lower position toward an upper position the respective tooth will be forced to move from said retracted position to said hay-gripping position.

3. The anti-bending hay fork of claim 2 having an anti-bending assembly comprising an anti-bending tube having an anti-bending shaft therein and telescoping with respect thereto slidably about a sliding axis parallel to said tooth-control shaft axis, said hay fork having two anchor parts, one of said anchor parts being a part of said tooth-control shaft disposed below said housing, the other of said anchor parts being said housing itself, means attaching said anti-bending tube and said anti-bending shaft each to a different one of said two anchor parts whereby said anti-bending assembly resists rotation of said shaft and bending-distortion of parts of said hay fork as said teeth engage unevenly dense hay portions.

4. The anti-bending hay fork of claim 2 in which said relief rod assemblies each comprise a tube snugly and slidably receiving the upper end of each pressing member whereby there are two tubes in each relief rod assembly, said means pivotally attaching the upper ends of each of said tube pressing members independently to said housing comprising a relief rod assembly carrying member to which said tubes are attached, said relief rod assembly carrying member being attached to said housing, compression springs being arranged around each of said relief rod assemblies and being each anchored at its upper end on a tube and at its lower end on a respective pressing member so that each compression spring has the effect of causing said pressing members to be restrained from moving upwardly with respect to its receiving tube and yet providing a yielding nature to the respective relief rod assembly to allow it to yield so that the various teeth can yield varying amounts to accommodate an uneven load.

5. The anti-bending hay fork of claim 4 in which plates are attached one to each of the lower ends of each of said pressing members, said plates being disposed one on each side of each tooth, means pivotally connecting said plates each to its respective tooth.

6. The anti-bending hay fork of claim 5 in which said plates and a tooth are attached together by means other than the pivot connector and at a place alongside the pivot connector so that the plates move rigidly together as one unit for giving the tooth further resistance against bending.

* * * * *